Oct. 26, 1943.  L. E. MRAZ  2,333,033
BONE SPLINT
Filed June 11, 1943  2 Sheets-Sheet 1
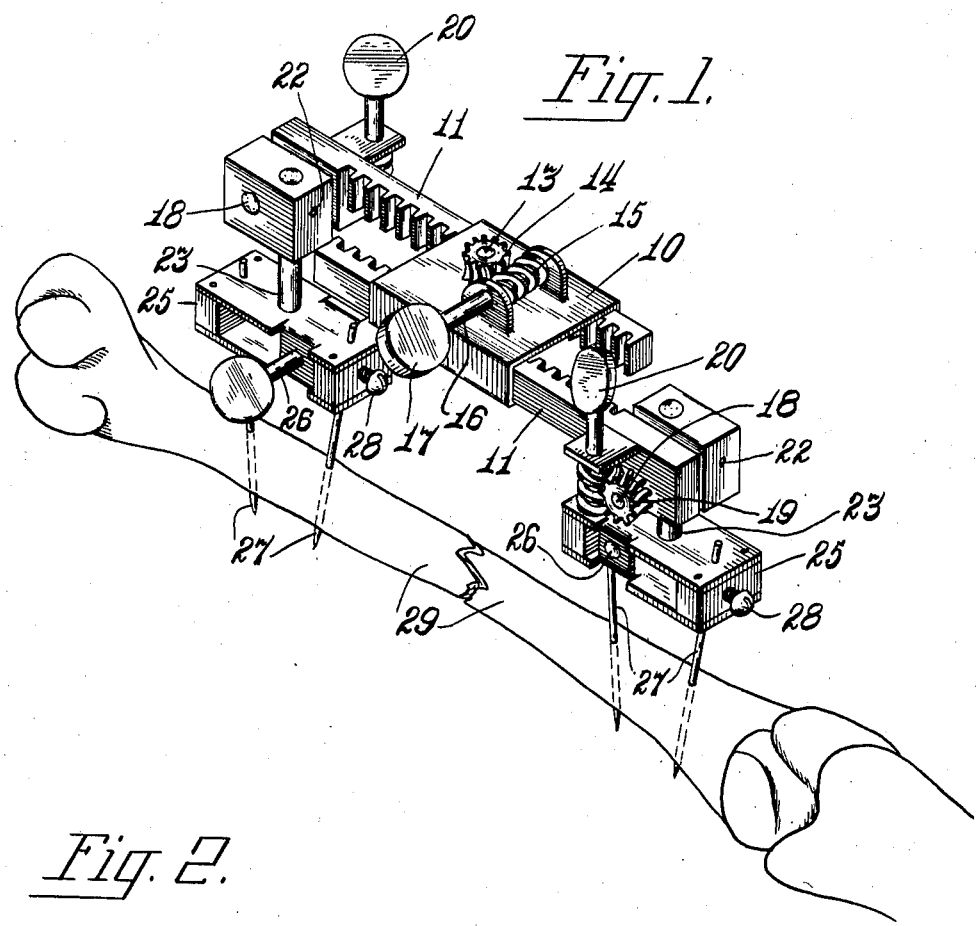
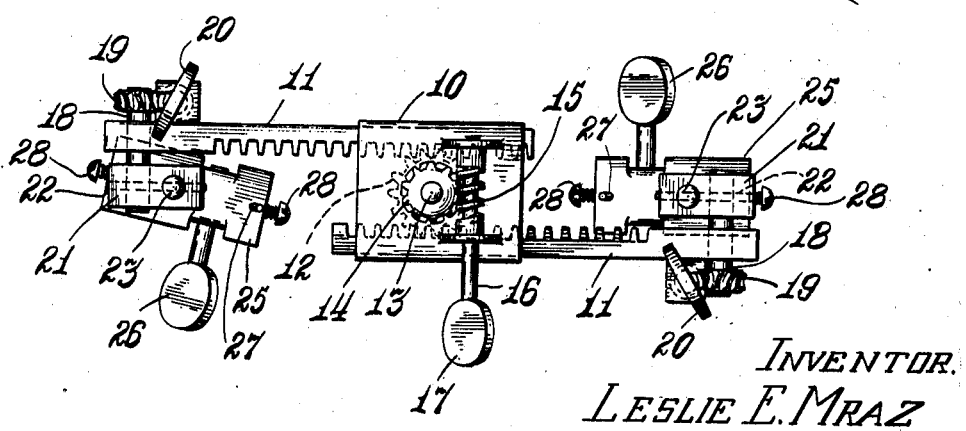
INVENTOR.
LESLIE E. MRAZ
Brayton Richards
ATTORNEY.

Oct. 26, 1943.  L. E. MRAZ  2,333,033
BONE SPLINT
Filed June 11, 1943  2 Sheets-Sheet 2
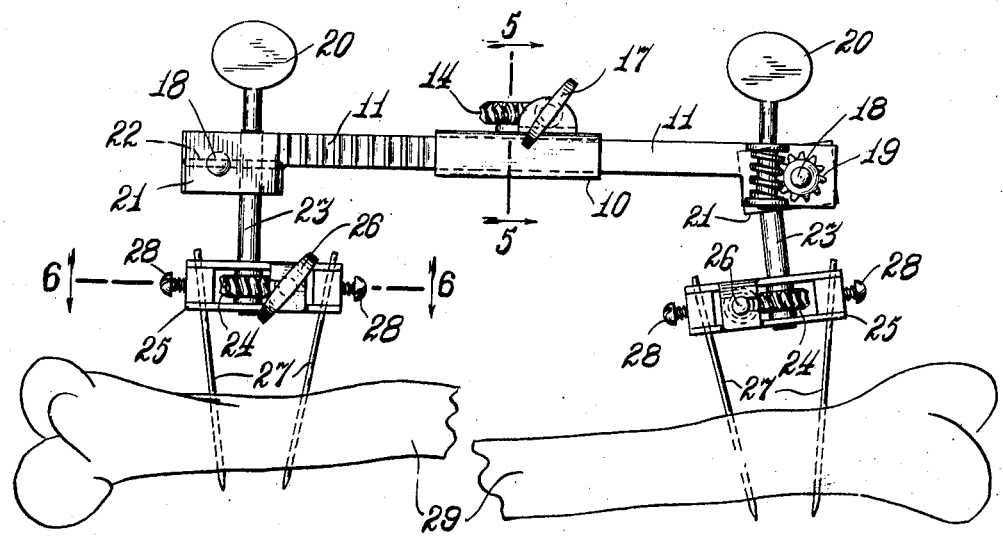
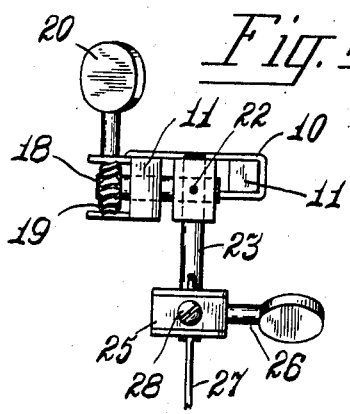
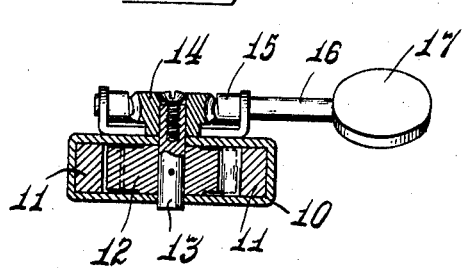
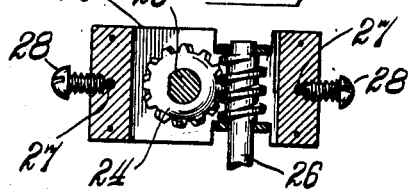
INVENTOR.
LESLIE E. MRAZ.
Brayton Richards
ATTORNEY.

Patented Oct. 26, 1943

2,333,033

UNITED STATES PATENT OFFICE 2,333,033

BONE SPLINT

Leslie E. Mraz, Stickney, Ill.

Application June 11, 1943, Serial No. 490,394

5 Claims. (Cl. 128—92)

The invention relates to improvements in bone-splints and has for its primary object the provision of an improved construction of the character indicated which is capable of economical production and highly efficient in use.

Other objects will appear hereinafter.

The invention consists of the combinations and arrangements of parts hereinafter described and claimed.

The invention will be best understood by reference to the accompanying drawings forming a part of this specification and in which—

Fig. 1 is a perspective view of a bone splint embodying the invention and shown in position of use;

Fig. 2, a top plan view of the same;

Fig. 3, a side view of the same;

Fig. 4, an end view of the same;

Fig. 5, a section taken substantially on line 5—5 of Fig. 3; and

Fig. 6, a section taken substantially on line 6—6 of Fig. 3.

The embodiment of the invention illustrated in the drawings comprises a central guide block 10 having two rack bars mounted therein to slide longitudinally in spaced parallel relation with their rack teeth facing each other, as shown. A pinion 12 is rotatably mounted in the guide block 10 between said rack bars and with its teeth meshing with the teeth on the rack bars. For this purpose the pinion 12 is mounted upon a worm shaft 13 carrying a worm wheel 14 of the self-locking type meshing with a worm 15 on an adjusting shaft 16 carrying a finger piece 17, and whereby the rack bars 11 may be readily adjusted longitudinally in either direction and will be automatically locked in such adjusted positions by interaction between the worm wheel 14 and the worm 15, as will be readily understood.

A worm shaft 18 is extended laterally through the outer end of each of the rack bars 11 and carries at one end a worm wheel 19 of the self-locking type meshing with the worm on an adjusting shaft 20. The other end of each shaft 18 carries an adjusting block 21 secured thereto by a securing screw 22, and a stud worm shaft 23 is mounted in each block 21, being rigidly secured therein by means of the securing screw 22 as indicated. Each worm shaft 23 carries a worm wheel 24 of the self-locking type and a bone adjusting head 25 swiveled thereon so as to be free to swing to said stud shaft. Each adjusting head 25 carries an adjusting shaft 26 having a worm meshing with the corresponding worm wheel 24, and whereby each head 25 may be readily swung around the shaft 23 acting as a pivot. Each adjusting head 25 carries two angularly arranged point prongs 27 secured in place by a set screw 28, said prongs being adapted to penetrate and engage a bone fragment 29, as indicated.

By this arrangement, in case of a fracture of a bone, the bone fragments may be engaged by the prongs 27 and thus attached to the adjusting heads 25; then the rack bars 11 may be readily adjusted longitudinally and the heads 25 adjusted angularly about two axes to bring the fragments of the bone in proper relation for knitting, and the interaction of the worm gearing adjustments will automatically lock said bone fragments in place for proper knitting. By employing worm gearing of the self-locking type for effecting the various adjustments, very slow but correspondingly powerful and accurate adjustments may be effected and the bone parts quickly brought into proper alignment under proper pressure and automatically so held, thus properly setting the bone fragments with a minimum of disturbance of the surrounding tissues.

The prongs 27 are preferably made of stainless steel and the heads 25 of the same material, so as to prevent any corrosion or galvanic action between the prongs, and the remaining parts are preferably made of plastic or other moldable material in order to render them as light in weight as possible.

The specific form and arrangement of parts is a simple and effective one for the purpose.

While I have illustrated and described the preferred form of construction for carrying the invention into effect, this is capable of variation and modification without departing from the spirit of the invention. I therefore do not wish to be limited to the precise details disclosed, but desire to avail myself of such variations and modifications as fall within the scope of the appended claims.

I claim:

1. A bone splint comprising a central guide block; two rack bars mounted in said block to slide longitudinally in spaced parallel relation and arranged with their rack teeth facing each other; a pinion rotatably mounted in said block between said rack bars and meshing therewith; worm gearing of the self-locking type for rotating said pinion to draw said bars together or force them apart; and bone-engaging means on the outer portion of each rack.

2. The construction specified in claim 1 in which a worm gearing is arranged to rotate said pinion and each bone-engaging means is adjustable on its rack bar.

3. The construction specified in claim 1 in which each bone-engaging means is adjustable on its rack bar and a worm gearing of the self-locking type is arranged to effect such an adjustment.

4. The construction specified in claim 1 in which each rack bar carries at its outer end a rotatable worm shaft and worm of the self-locking type for adjusting the same; each of said worm shafts carries a stud worm shaft having a worm wheel of the self-locking type thereon; each stud worm shaft carries an adjusting head swiveled thereon and having an adjusting worm shaft meshing with the worm on said stud shaft; and bone-engaging prongs on said adjusting head.

5. A bone splint comprising two bone-engaging members; worm gearing of the self-locking type operatively connected with said members for adjusting and locking them in adjusted positions; and means for separating or drawing said bone-engaging members together.

LESLIE E. MRAZ.